United States Patent
Zhou

(10) Patent No.: US 7,783,118 B2
(45) Date of Patent: Aug. 24, 2010

(54) METHOD AND APPARATUS FOR DETERMINING MOTION IN IMAGES

(75) Inventor: Hui Zhou, Toronto (CA)

(73) Assignee: Seiko Epson Corporation, Tokyo (JP)

(*) Notice: Subject to any disclaimer, the term of this patent is extended or adjusted under 35 U.S.C. 154(b) by 1076 days.

(21) Appl. No.: 11/457,349

(22) Filed: Jul. 13, 2006

(65) Prior Publication Data

US 2008/0037869 A1 Feb. 14, 2008

(51) Int. Cl.
*G06K 9/36* (2006.01)
*G06K 9/32* (2006.01)
*G06K 9/34* (2006.01)

(52) U.S. Cl. ............... 382/236; 382/173; 382/107; 382/294; 348/154

(58) Field of Classification Search ........ 382/100, 382/107, 173, 181, 189, 190, 195, 224, 276, 382/286, 287, 289, 293, 294; 348/14.15, 348/439.1, E17.003, E5.066, E5.054; 375/240.01, 375/E7.04, E7.065, E7.081, E7.105, E7.256
See application file for complete search history.

(56) References Cited

U.S. PATENT DOCUMENTS

| | | | |
|---|---|---|---|
| 5,748,761 A * | 5/1998 | Chang et al. ............... 382/107 |
| 5,929,940 A * | 7/1999 | Jeannin ...................... 348/699 |
| 5,995,668 A | 11/1999 | Corset et al. |
| 6,075,875 A | 6/2000 | Gu |
| 6,078,701 A * | 6/2000 | Hsu et al. ................... 382/294 |
| 6,262,409 B1 | 7/2001 | Avaro et al. |
| 6,301,385 B1 | 10/2001 | Chen et al. |
| 6,335,985 B1 * | 1/2002 | Sambonsugi et al. ........ 382/190 |
| 6,535,620 B2 * | 3/2003 | Wildes et al. ............... 382/107 |
| 6,625,310 B2 | 9/2003 | Lipton et al. |
| 6,636,635 B2 * | 10/2003 | Matsugu ..................... 382/218 |
| 6,711,278 B1 | 3/2004 | Gu et al. |
| 6,870,945 B2 * | 3/2005 | Schoepflin et al. .......... 382/103 |
| 7,142,600 B1 * | 11/2006 | Schonfeld et al. ...... 375/240.16 |
| 7,227,893 B1 * | 6/2007 | Srinivasa et al. ....... 375/240.08 |
| 7,440,615 B2 * | 10/2008 | Gong et al. ................ 382/173 |
| 7,508,990 B2 * | 3/2009 | Pace .......................... 382/236 |
| 7,522,749 B2 * | 4/2009 | Zitnick et al. .............. 382/107 |
| 2002/0176625 A1 | 11/2002 | Porikli et al. |
| 2003/0133503 A1 | 7/2003 | Paniconi et al. |
| 2003/0235327 A1 | 12/2003 | Srinivasa |
| 2004/0091047 A1 | 5/2004 | Paniconi et al. |
| 2004/0165781 A1 | 8/2004 | Sun |
| 2004/0252886 A1 | 12/2004 | Pan et al. |
| 2004/0258154 A1 * | 12/2004 | Liu et al. ............... 375/240.16 |

OTHER PUBLICATIONS

Chien et al., "Efficient moving object segmentation algorithm using background registration technique", IEEE Transactions on Circuits and Systems for Video Technology, vol. 12, No. 7, Jul. 2002, p. 577-586.*

Haris et al., "Hybrid image segmentation using watershed and fast region merging", IEEE Transactions on Image Processing, vol. 7, No. 12, Dec.*

* cited by examiner

*Primary Examiner*—Andrew W Johns
*Assistant Examiner*—Tahmina Ansari

(57) ABSTRACT

A method of determining motion in a set of input images comprises registering the images in the set to identify stationary background content therein and generating difference images based on the registered images. The input images are segmented into regions and local motion within each of the regions is estimated. A determination as to whether the regions include moving content or static content is determined based on the difference images and the estimated local motion within the regions.

14 Claims, 4 Drawing Sheets

METHOD AND APPARATUS FOR DETERMINING MOTION IN IMAGES

FIELD OF THE INVENTION

The present invention relates generally to image processing and more particularly to a method, apparatus and computer readable medium embodying a computer program for determining motion in images.

BACKGROUND OF THE INVENTION

Motion information is useful in digital image analysis and processing and a number of techniques to detect motion in a series or sequence ("set") of images or video frames ("images") have been considered. One common technique used to detect motion in an image is motion segmentation. Motion segmentation attempts to partition an image into parts having different motions.

Generally, two types of motion segmentation are known. One motion segmentation technique assumes that the camera used to capture the image is fixed, and thus that the background content of the image is stationary. Video surveillance commonly employs this motion segmentation technique to detect motion in captured images. The other motion segmentation technique assumes that the camera used to capture the image has motion resulting in both moving foreground and background content. Although many applications, such as for example object tracking, accurate motion estimation, and computer vision, employ this motion segmentation technique, this motion segmentation technique presents challenges in that there are no general definitions of what constitutes foreground and background in captured images.

Other attempts to detect motion in images have been considered. For example, U.S. Pat. No. 5,995,668 to Corset et al. discloses a method and system for coding and decoding segmented image frames. The system comprises a first sub-system defining the time evolution of segmented partitions, and a second sub-system encoding both contours and textures of regions within the partitions. The time evolution definition leads to a partition tree from which regions are extracted during an analysis step in order to form a decision tree. A decision operation allows distinct regions from various levels of the partition tree to be selected in order to construct an optimal final partition and, simultaneously, to choose the coding technique for each region of the final partition. Motion is estimated by dividing an image frame into small blocks of pixels and comparing the pixels to same-size blocks in a previous image frame. The closest match indicates the motion vectors for all blocks. Motion is compensated for by applying the resultant motion vectors to regions in the image frames. Region boundaries are defined using the Watershed algorithm.

U.S. Pat. No. 6,075,875 to Gu discloses a method for segmenting and tracking arbitrary shapes in a series of video image frames. In an intraframe mode of operation, a motion representation of corresponding pixels in the selected video image frame and a preceding video image frame is obtained to form motion-segmented video image features. Video image features are also segmented according to their spatial image characteristics to form spatially-segmented video image features. The video image features are jointly segmented as a weighted combination of the motion-segmented video features and the spatially-segmented video image features.

U.S. Pat. No. 6,301,385 to Chen et al. discloses a method and apparatus for segmenting images. Multiple segmentation approaches including motion segmentation, focus segmentation and intensity segmentation are employed to provide input to a two-layered neural network. Focus and motion measurements are taken from high frequency data in the images and intensity measurements are taken from low frequency data in the images. The focus and motion measurements are used to segment an object allowing moving foreground to be segmented from stationary foreground as well as from moving and stationary background.

U.S. Pat. No. 6,625,310 to Lipton et al. discloses a method for segmenting video data into foreground and background utilizing statistical modeling of image pixels. A statistical model of the background is built and each pixel of an input video frame is compared with the background statistical model. The results of the comparisons are used to classify each pixel as foreground or background.

U.S. Pat. No. 6,711,278 to Gu et al. discloses a method for tracking semantic objects with multiple non-rigid motion, disconnected components and multiple colors. The semantic objects are tracked by spatially segmenting image regions from an input image frame and classifying the image regions based on the semantic object from which they originated in the previous image frame. Region-based motion estimation between each spatially segmented region and the previous image frame is carried out to compute the position of a predicted region in the previous image frame. Each region in the current image frame is then classified as being part of a semantic object based on which semantic object in the previous image frame contains the most overlapping points of the predicted region. In this manner, each region in the current image frame is tracked to one semantic object from the previous image frame, with no gaps or overlaps.

U.S. Patent Application Publication No. 2002/0176625 to Porikli et al. discloses a method for segmenting multi-resolution video objects in a sequence of video frames. Feature vectors are assigned to the pixels of the video frames. Selected pixels in the video frames are then identified as marker pixels and pixels adjacent to each marker pixel are assembled into corresponding volumes of pixels if the distance between the feature vector of the marker pixel and the feature vector of the adjacent pixels is less than a first predetermined threshold. After all pixels have been assembled into the volumes, a first score and descriptors are assigned to each volume. At this point, each volume represents a segmented video object. The volumes are then sorted from highest to lowest order according to the first scores, and further processed in that order. Second scores, dependent on the descriptors of pairs of volumes are then determined. The volumes are iteratively combined if the second score passes a second threshold.

U.S. Patent Application Publication No. 2003/0133503 to Paniconi et al. discloses a motion segmentation technique employing multi-frame motion estimation. The motion segmentation operates by determining multiple classification hypotheses and by re-classifying poorly classified regions according to a multi-frame hypothesis tracking algorithm. This involves determining a similarity measure for each hypothesis class, and then assigning a classification to the region with the hypothesis class that is most similar or consistent with past or future data.

U.S. Patent Application Publication No. 2003/0235327 to Srinivasa discloses a method for detecting and tracking objects in video images. A detection module receives images, extracts edges in horizontal and vertical directions, and generates an edge map where object-regions are ranked by their immediacy. Filters remove attached edges and ensure regions have proper proportions. The regions are tested using a geometric constraint to ensure proper shape, and are fit with best-fit rectangles, which are merged or deleted depending on their relationships. Remaining rectangles are objects. A tracking module receives images in which objects are detected and uses Euclidean distance/edge density criterion to match objects. If objects are matched, clustering determines whether the object is new. If an object is deemed not to be new, a sum-of-squared-difference in intensity test is used to locate matching objects.

U.S. Patent Application Publication No. 2004/0091047 to Paniconi et al. discloses a method and apparatus for detecting nonlinear and multiple motion in images. When an input image is received, the input image is partitioned into regions, and a motion model is applied to each region to extract the motion and associated moving boundaries.

U.S. Patent Application Publication No. 2004/0165781 to Sun discloses a method for determining motion vectors from one point in an image frame of a scene to corresponding points in at least two other image frames of the scene. Each point in a reference image frame has projected thereon corresponding points from two other image frames in order to provide a system of equations that describe point correspondence across the three images. Pointwise displacement between the three frames is then calculated to detect motion.

U.S. Patent Application Publication No. 2004/0252886 to Pan et al. discloses a method of automatic video object extraction. Color segmentation and motion segmentation are performed on source video. Color segmentation identifies substantially uniform color regions using a seed pixel and a neighborhood method and merges small color regions into larger ones. The motion segmentation for each region identified by color, determines the motion vector for the region by region matching to a subsequent image frame. Once a motion vector for each region is obtained, a motion mask is made.

Although the aforementioned references disclose various techniques for motion segmentation, there exists a need for a computationally efficient yet accurate motion segmentation technique. It is therefore an object of the present invention to provide a novel method, apparatus and computer readable medium embodying a computer program for determining motion in images.

SUMMARY OF THE INVENTION

Accordingly, in one aspect there is provided a method of determining motion in a set of input images, said method comprising:

registering the images in said set to identify stationary background content therein;

generating difference images based on the registered images;

segmenting the input images into regions;

estimating local motion within each of said regions; and determining whether the regions include moving content or static content based on the difference images and the local estimated motion within said regions.

During registering, one of the images in the set is identified as a reference image and the remaining images in the set are registered to the reference image. The difference image generating comprises determining the difference between each remaining image in the set and the reference image to yield absolute intensity difference images.

In one embodiment, the difference images are binarized and noise filtered. The noise filtering is performed by morphing the binarized images.

In one embodiment, the segmenting comprising applying the Watershed algorithm to the input images and compensating for over-segmentation of the input images. The compensating comprises merging each region of each input image that is below a threshold size with a boundary region. The boundary region is selected from one of a region greater than a threshold size and the largest boundary region smaller than the threshold size.

In one embodiment, the local motion estimating comprises generating a motion vector for each region in each of the input images with the exception of the last input image in the set. The motion vector generating for each region comprises, for each pixel in the region, calculating the absolute difference between the pixel and a corresponding pixel in the subsequent input image in the set, summing the calculated absolute differences, shifting the position of the region according to a search pattern and for each position in the search pattern reperforming the calculating and summing and selecting the motion vector associated with the position of the region that yields the minimum absolute difference sum.

The region content determining for each region comprises determining whether the motion vector for the region signifies movement above a threshold and if so labeling the region as representing moving content; if not, determining whether the percentage of pixels in the region have a pixel value above a threshold in a corresponding difference image and if so labeling the region as representing moving content; and if not labeling the region as representing static content. The region labeling is refined based on classification of corresponding regions in other input images and classification of neighboring regions. For the last input image in the set, the local motion estimating comprises projecting motion shifted pixels from regions of the second last input image onto the last input image and determining whether a threshold number of projected motion shifted pixels fall within corresponding regions of the last input image.

According to another aspect there is provided a method of determining motion in a set of input images, said method comprising:

designating one of the images in said set as a reference image;

creating a set of dominant motion compensated images from said set of images based on differences between the remaining images in said set and said reference image;

creating a set of intensity difference images from said dominant motion compensated images based on differences between the dominant motion compensated images and said reference image;

segmenting each of said input images into regions;

generating motion vectors for said regions based upon aggregate motion of pixels in each region;

classifying each region in each of the images in said set with the exception of the last image as including moving or static content on the basis of at least one of the motion vectors and the corresponding intensity difference images; and using backward tracking to classify the regions in said last image.

According to yet another aspect there is provided an apparatus for determining motion in a set of input images, said apparatus comprising:

an image alignor registering the images in said set to identify stationary background content therein;

a comparator generating difference images based on the registered images;

a segmentor segmenting the input images into regions; and an estimator estimating local motion within each of said regions and determining whether the regions include moving content or static content based on the difference images and the local estimated motion within said regions.

According to still yet another aspect there is provided a computer readable medium embodying a computer program for determining motion in a set of input images, said computer program comprising:

computer program code for registering the images in said set to identify stationary background content therein;

computer program code for generating difference images based on the registered images;

computer program code for segmenting the input images into regions;

computer program code for estimating local motion within each of said regions; and computer program code for determining whether the regions include moving content or static content based on the difference images and the local estimated motion within said regions.

According to still yet another aspect there is provided a computer readable medium embodying a computer program for determining motion in a set of input images, said computer program comprising:

computer program code for designating one of the images in said set as a reference image;

computer program code for creating a set of dominant motion compensated images from said set of images based on differences between the remaining images in said set and said reference image;

computer program code for creating a set of intensity difference images from said dominant motion compensated images based on differences between the dominant motion compensated images and said reference image;

computer program code for segmenting each of said input images into regions;

computer program code for generating motion vectors for said regions based upon aggregate motion of pixels in each region;

computer program code for classifying each region in each of the images in said set with the exception of the last image as including moving or static content on the basis of at least one of the motion vectors and the corresponding intensity difference images; and computer program code for classifying the regions in said last image using backward tracking.

BRIEF DESCRIPTION OF THE DRAWINGS

Embodiments will now be described more fully with reference to the accompanying drawings in which.

DETAILED DESCRIPTION OF THE EMBODIMENTS

In the following description, an embodiment of a method, apparatus and computer readable medium embodying a computer program for determining motion in images is provided. The images in the set are initially registered to identify stationary background content therein and difference images based on the registered images are generated. The input images are then segmented into regions and local motion within each of the regions is estimated. A determination as to whether each region includes moving content or static content is determined based on the difference images and the estimated local motion within the region.

The method and apparatus may be embodied in a software application including computer executable instructions executed by a processing unit such as a personal computer or other computing system environment. The software application may run as a stand-alone digital image processing tool or may be incorporated into other available digital image processing applications to provide enhanced functionality to those digital image processing applications. The software application may comprise program modules including routines, programs, object components, data structures etc. and be embodied as computer-readable program code stored on a computer-readable medium. The computer-readable medium is any data storage device that can store data, which can thereafter be read by a computer system. Examples of computer-readable medium include for example read-only memory, random-access memory, hard disk drives, magnetic tape, CD-ROMs and other optical data storage devices. The computer-readable program code can also be distributed over a network including coupled computer systems so that the computer-readable program code is stored and executed in a distributed fashion.

Figure 1:
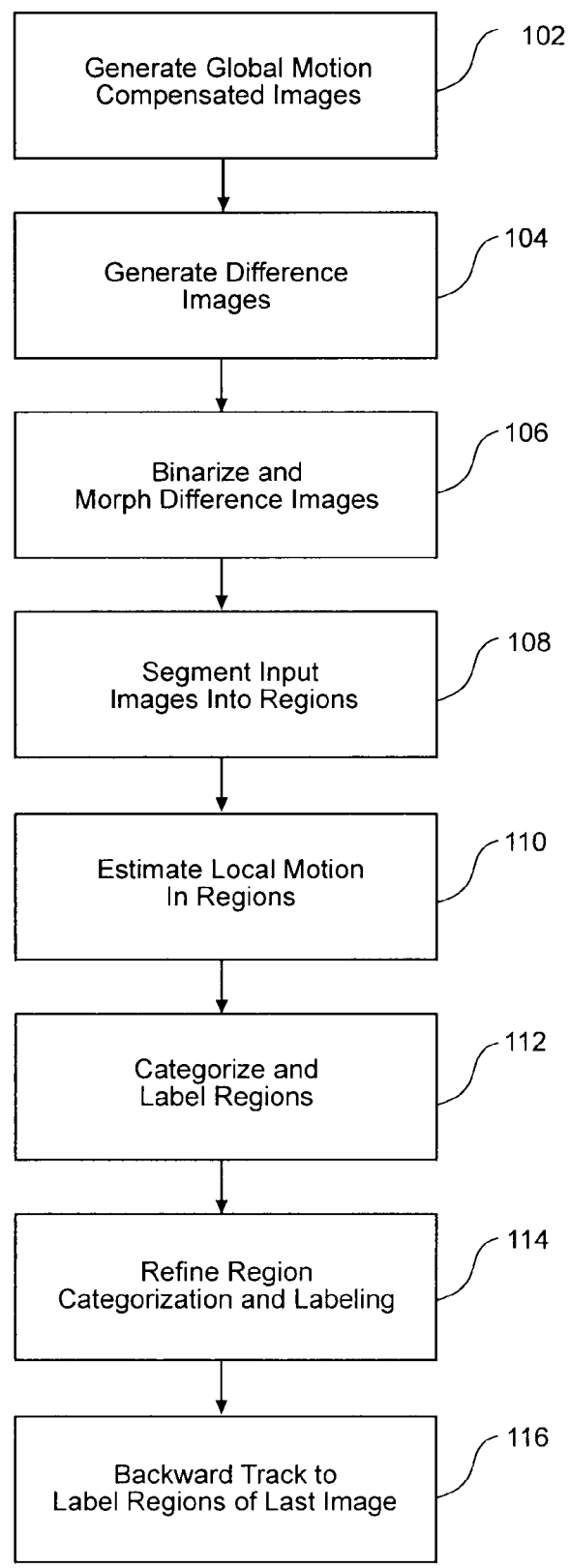
FIG. 1 is a flowchart showing the general steps performed during image motion detection.

Turning now to FIG. 1, the general steps performed during image motion detection and estimation are shown and generally identified by reference numeral 100. When a set of input images is to be processed to identify motion therein, global motion compensated images are firstly generated to compensate for background motion in the images of the set (step 102). Difference images based on the global motion compensated images are generated (step 104). The difference images are then binarized and morphed (step 106). Each input image is then segmented into regions (step 108) and the local motion for each region in each input image is estimated (step 110). Each region in each input image except for the last input image is then categorized and labeled as either foreground or background using the estimated local motion and the difference images (step 112). The categorization of regions is then refined (step 114) and the last input image in the set is processed using backward tracking to categorize and label its regions (step 116). As a result, different regions of the input images are accurately classified as including moving foreground content or stationary background content.

When compensating for background motion, it is assumed the background accounts for the dominant motion in the input images of the set. Thus, by firstly compensating for background motion, the background in the input images can be treated as stationary during subsequent processing. During step 102, initially the input images in the set are converted to greyscale if they are color images and the first greyscale input image in the set is designated as a reference image. Each remaining greyscale input image in the set is then registered with its adjoining images using a feature-based registration approach. In this embodiment, a corner matching registration technique is used such as that disclosed in U.S. Patent Application Publication No. US2005/0063608 to Clarke et al., the content of which is incorporated herein by reference. In general, during corner matching, a local neighborhood cross-correlation is performed to match the corners within the adjacent images. A matching score is calculated by determining the shift and rotation consistency within the neighborhoods of each corner. Next, corners that are not matching one-to-one are disambiguated by relaxing the matching constraints. As a result, the corners in adjoining images of the set are registered.

A projective transform is then estimated based on the matching corners in each pair of adjoining images resulting in transformation matrices that project each image onto its adjoining image and hence, onto the reference image. The transformation between the adjacent images is estimated a pre-defined number of times and the resulting image fits are calculated. To estimate each transformation, four pairs of corners are randomly chosen from the images and are used to solve a set of eight linear equations. Each estimated transformation is then applied to all of the matching pairs of corners in the images and the number of corner pairs in the images that yield a similar transformation is determined thereby to determine an image fit. The estimated transformation that yields the best fit is then selected and the selected transformation is refined. During refining, other matching corners in the images that are supported by the selected transformation are combined to form a set of over-constrained linear equations. These linear equations are then solved to refine the selected transformation. The transformation matrices are then applied to the second to last images in the set resulting in a set of greyscale images that are aligned to the reference image and thereby yielding a set of global motion compensated images.

Using the above feature-based registration technique results in features that do not move consistently with dominant background features, being filtered out. This enables the backgrounds of the greyscale images in the set to be registered with the reference image within acceptable limits. The backgrounds of these images, which have been motion compensated, are stationary allowing foreground motion within the images to be more easily detected during subsequent processing as will be described.

As mentioned above with reference to step 104, once the global motion compensated images have been generated, absolute intensity difference images are generated by determining the difference between each global motion compensated non-reference image and the reference image. As will be appreciated, the difference image is an all-zero image for the reference image as the reference image is compared to itself.

During step 106, each difference image is thresholded to binarize the difference image. In this embodiment, each pixel of each difference image is compared with a threshold value, in this case fifteen (15). If the value of the pixel is greater than the threshold value, the pixel value is set to one (1); otherwise the pixel value is set to zero (0). Each binarized difference image is then checked to determine if it is an all-zero image signifying no or nominal motion. If the binarized difference image is an all-zero image, it is not further processed. If the difference image is not an all-zero image, morphological open and close operations employing a 3×3 8-neighbor kernel are then applied on the binarized difference image. As is well known to those of skill in the art, the morphological open operation separates connected objects and the morphological close operation fills small holes in objects. Thus, these morphological operations provide a certain amount of smoothing to the binarized difference images and hence, reduce noise in the binarized difference images.

During step 108, a 3×3 box filter is applied to each greyscale input image to remove noise. A Sobel edge detector is then applied to each filtered greyscale input image to generate a corresponding edge image. The Watershed algorithm is applied to each edge image to separate the edge image into regions. The Watershed algorithm is described in the publication entitled "Watersheds in Digitized Spaces: An Efficient Algorithm Based on Immersion Simulation" authored by L. Vincent and P. Soille in IEEE Transactions on Pattern Analysis and Machine Intelligence, vol. 13, pg. 583-598, 1991, the content of which is incorporated herein by reference.

As is known, applying the Watershed algorithm to the edge images can result in over-segmentation. To deal with over-segmentation, regions in each edge image that are smaller than a certain size are merged into neighboring regions until all regions are larger than the threshold size.

Figure 2:
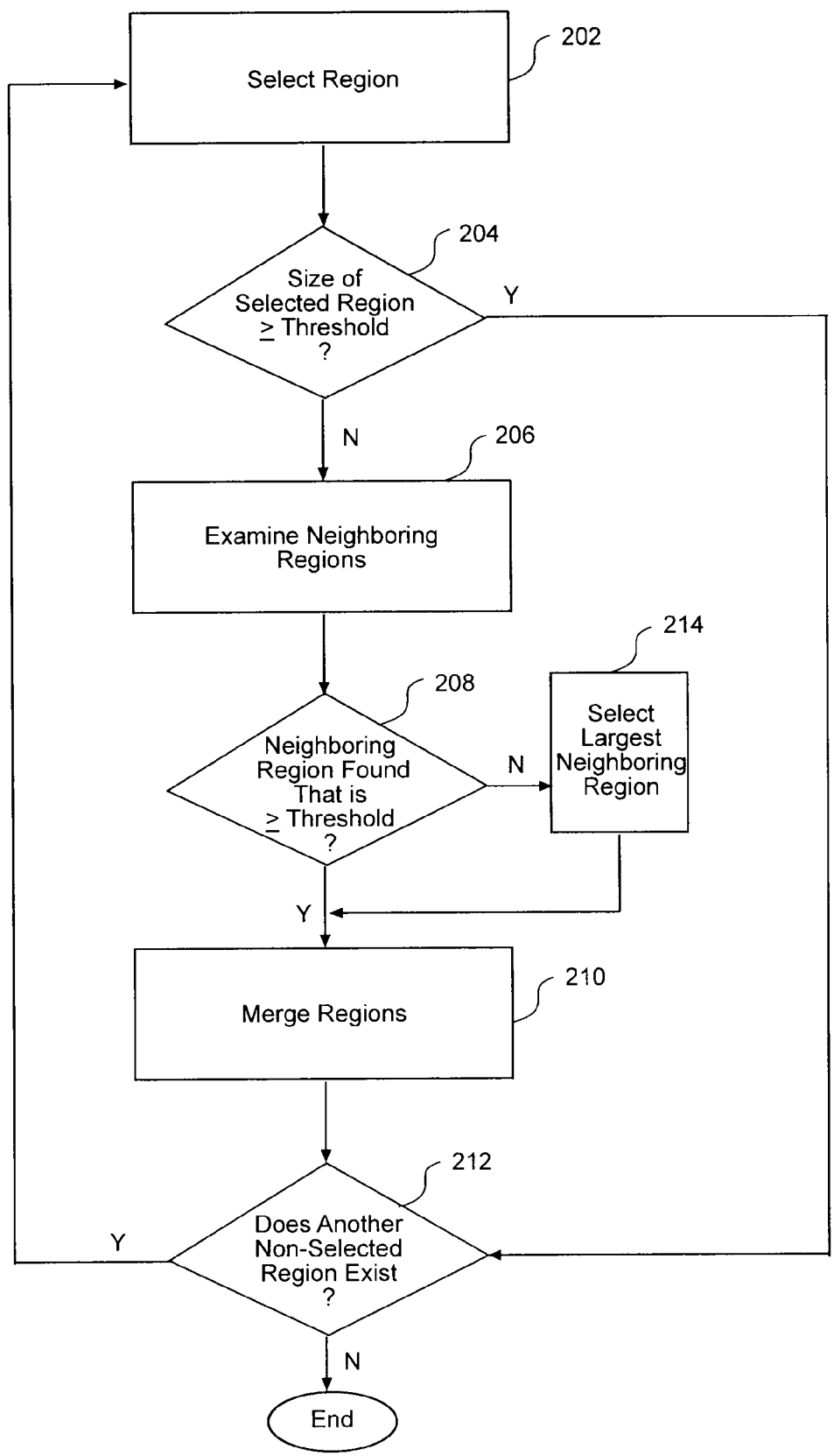
FIG. 2 is a flowchart showing the steps performed during region merging.

Turning now to FIG. 2 and with reference to Appendix A, the steps performed during merging of regions in an edge image to deal with over-segmentation are shown. Initially one of the regions in the edge image being processed is selected (step 202). The size of the selected region is compared to a threshold size, that is selected to suit the particular application. In this embodiment a threshold size equal to twenty-five (25) is used (step 204). If the size of the selected region is less than the threshold size, the neighbor regions sharing a boundary with the selected region are examined one at a time (step 206) to determine if a neighbor region sharing a boundary with the selected region has a size greater than or equal to the threshold size (step 208). When such a neighbor region is found, the selected region is merged with the located neighbor region to form a new combined region having a size larger than the threshold size (step 210). A check is then made to determine if another region in the edge image exists that is smaller than the threshold size (step 212). If not, the merging is deemed to have been completed. If another region in the edge image exists that is smaller than the threshold size, that region is selected (step 202) and the above process is re-preformed.

At step 208, if a neighbor region sharing a boundary with the selected region having a size greater than the threshold size does not exist, the largest neighbor region sharing a boundary with the selected region is selected (step 214) and merged with the selected region (step 210). If the size of the merged region is greater than the threshold region, it is not processed further. If however the merged region is still less than the threshold size, it remains available for selection at step 202.

At step 204, if the size of the selected region is greater than the threshold size, the region is deemed not to require merging (step 212) and the process proceeds to step 212 to determine if another region requires processing. The end result of the region merging is a set of edge images that have been segmented into regions greater than a threshold size.

With each edge image segmented into regions, the regions are applied to the corresponding greyscale input images and the regions of the greyscale input images are categorized and labeled (step 110). During this stage, local motion for each region of each greyscale input image with the exception of the last greyscale input image in the set is estimated. In particular, for each greyscale input image, a motion map is generated comprising a motion vector (dx,dy) for each region therein, where dx represents the horizontal motion in the region and dy represents the vertical motion in the region. All pixels within the same region have the same motion vector.

In order to determine the motion vectors for the regions, sums of absolute differences (SADs) are calculated for each region to measure its similarity to corresponding regions in the other greyscale input images. For each region, the motion vector associated with the minimum calculated SAD is used as the motion vector for the region.

Figure 3:
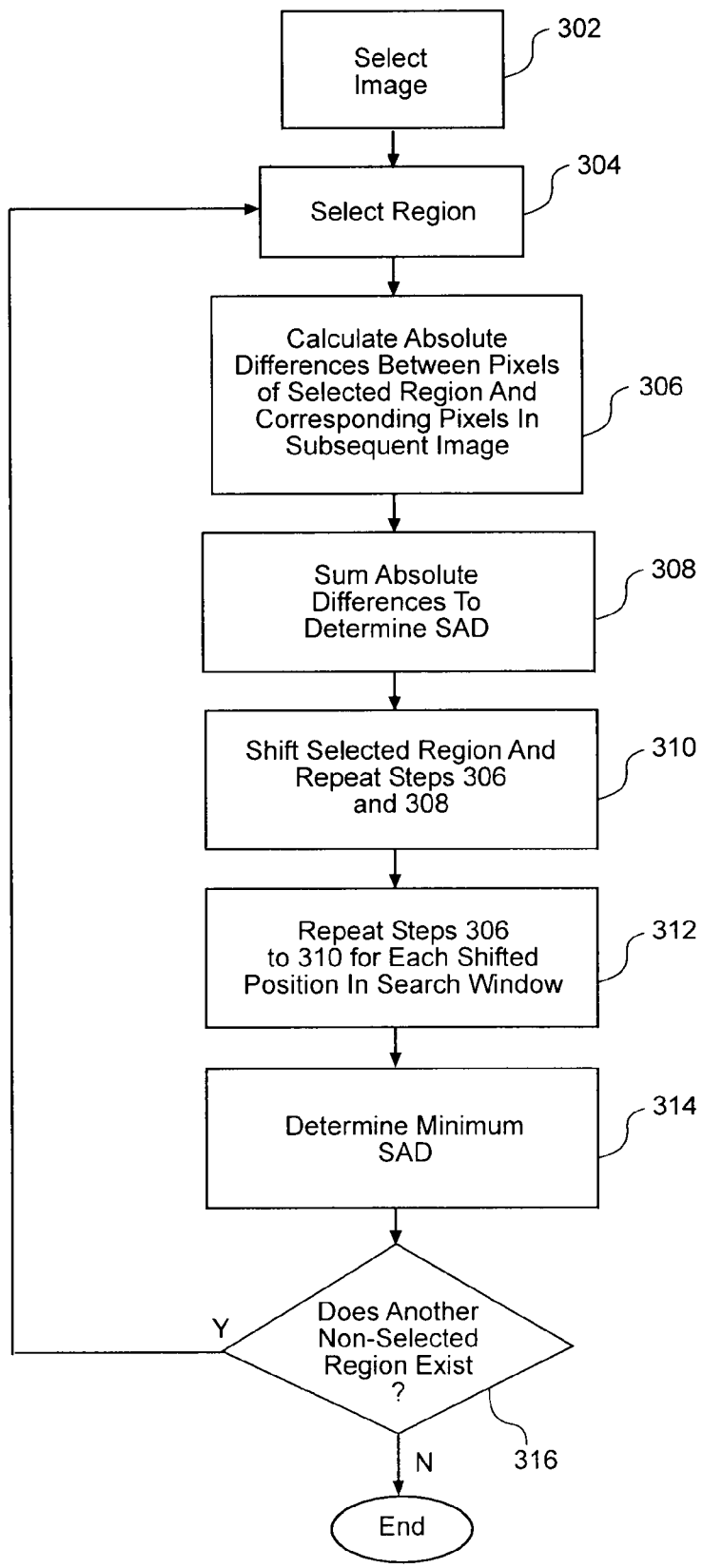
FIG. 3 is a flowchart showing the steps performed during region similarity measurement.

Turning now to FIG. 3, the steps performed during region similarity measurement are shown. Initially, the first greyscale input image in the set is chosen (step 302) and a region from the chosen greyscale input image is selected (step 304). For each pixel p in the selected region, the absolute difference between the pixel p and the corresponding pixel q in the greyscale image input corresponding to the subsequent greyscale input image in the set is calculated (step 306). The absolute differences calculated for the pixels p of the selected region are then summed to yield an SAD for the selected region (step 308). The selected region is then shifted within the greyscale input image according to the searching window shown in Table 1 below and steps 306 and 308 are repeated to yield SADs for the shifted selected region (step 310).

TABLE 1

| (−3, −3) | (−2, −3) | (−1, −3) | (0, −3) | (1, −3) | (2, −3) | (3, −3) |
|---|---|---|---|---|---|---|
| (−3, −2) | (−2, −2) | (−1, −2) | (0, −2) | (1, −2) | (2, −2) | (3, −2) |
| (−3, −1) | (−2, −1) | (−1, −1) | (0, −1) | (1, −1) | (2, −1) | (3, −1) |
| (−3, 0) | (−2, 0) | (−1, 0) | (0, 0) | (1, 0) | (2, 0) | (3, 0) |
| (−3, 1) | (−2, 1) | (−1, 1) | (0, 1) | (1, 1) | (2, 1) | (3, 1) |
| (−3, 2) | (−2, 2) | (−1, 2) | (0, 2) | (1, 2) | (2, 2) | (3, 2) |
| (−3, 3) | (−2, 3) | (−1, 3) | (0, 3) | (1, 3) | (2, 3) | (3, 3) |

As will be appreciated, this process is repeated for each shifted position of the selected region within the greyscale input image shown in the searching window resulting in a set of forty-nine (49) SADs being calculated for the selected region (step 312). The minimum SAD from the set of calculated SADs is then determined. The shift (dx,dy) corresponding to the minimum SAD is used to represent the motion vector of the selected region (step 314). For example, if the shift (−1,1) yields the minimum SAD, then the motion vector is deemed to be (−1,1).

A check is then made to determine if another region from the chosen greyscale input image exists that has not been selected (step 316). If so, that region is selected and the above process is re-performed. Otherwise, the local motion estimation for the regions of the first to second last i.e. $(N-1)^{th}$ greyscale input images is deemed to be completed.

For the first to second last greyscale input images in the set, each region is then classified and labeled as representing foreground motion or static background. During classification and labeling, the intensity difference images resulting from step 106 and the motion maps are used. In particular, assuming a region in a greyscale input image has M pixels and its corresponding motion vector is (dx, dy), the region is classified as representing foreground motion if at least one of the following conditions applies:

1. dx>T or dy>T, where T is a threshold equal to two (2).
2. at least fifteen (15) percent of the pixels in the region have a value equal to one (1) in the corresponding intensity difference image.

If the above conditions do not apply to the region, the region is labeled as representing static background.

Once the regions in the first to second last greyscale input images have been classified and labeled, the region classification and labeling is refined. During refining, for a given region in a greyscale input image, the labeling of corresponding regions in previous greyscale input images is checked. If more than seventy (70) percent of the pixels in a region have been classified as representing foreground motion in the three previous greyscale input images, the region is classified as representing foreground motion even though the region may not satisfy the above conditions. This maintains the coherency of the segmentation over time by assuming that for a small period of time, moving objects maintain consistent motion along their trajectories. This neighboring region information along the temporal axis helps to yield more robust results.

Neighboring region information is also used in the spatial domain. If a region is classified as representing foreground motion and its neighboring regions are classified as representing static background, and if the total size of the region's neighboring background regions is larger than the size of the region, and if the region is smaller than a certain size, then the region is re-classified as representing static background. The converse is true. That is if a region is classified as representing static background and its neighboring regions are classified as representing foreground motion, and if the total size of the region's neighboring foreground regions is larger than the size of the region, and if the region is smaller than a certain size, then the region is re-classified as representing foreground motion. This process helps to enforce spatial continuity.

As mentioned above, local motion estimation, region classification and labeling and classification refining is not performed in respect of the last greyscale input image in the set. This is due to the fact that the last greyscale image has no successive image to which pixels in the regions thereof can be compared to generate the motion map. Therefore, in order to classify and label regions in the last greyscale input image, backward tracking is introduced. During backward tracking, a forward warping is applied to the regions of the second last greyscale input image that have been labeled as representing foreground motion. During forward warping, the motion vectors of the regions are applied to the second last greyscale input image to generate a resultant image representing the second last greyscale input image after motion. The pixels of the resultant image that have moved during forward warping are then mapped to the last greyscale input image thereby to project the motion shifted pixels of the regions of the second last greyscale input image onto the last greyscale input image. For each region in the last greyscale input image, the percentage of the projected motion shifted pixels from the second last greyscale input image that fall within the region are examined. If the percentage is above a threshold value, the region is labeled as representing foreground motion. In this embodiment the percentage threshold value is equal to 33% although this percentage can be changed to suit the particular application. Otherwise, the region is labeled as representing static background. In other words, if a region in the last greyscale input image receives few projected pixels from its corresponding region in the second last greyscale input image, it is deemed to represent static background. Conversely, if a region in the last greyscale input images receives many projected pixels from its corresponding region in the second last greyscale input image, it is deemed to represent foreground motion.

Figure 4A:
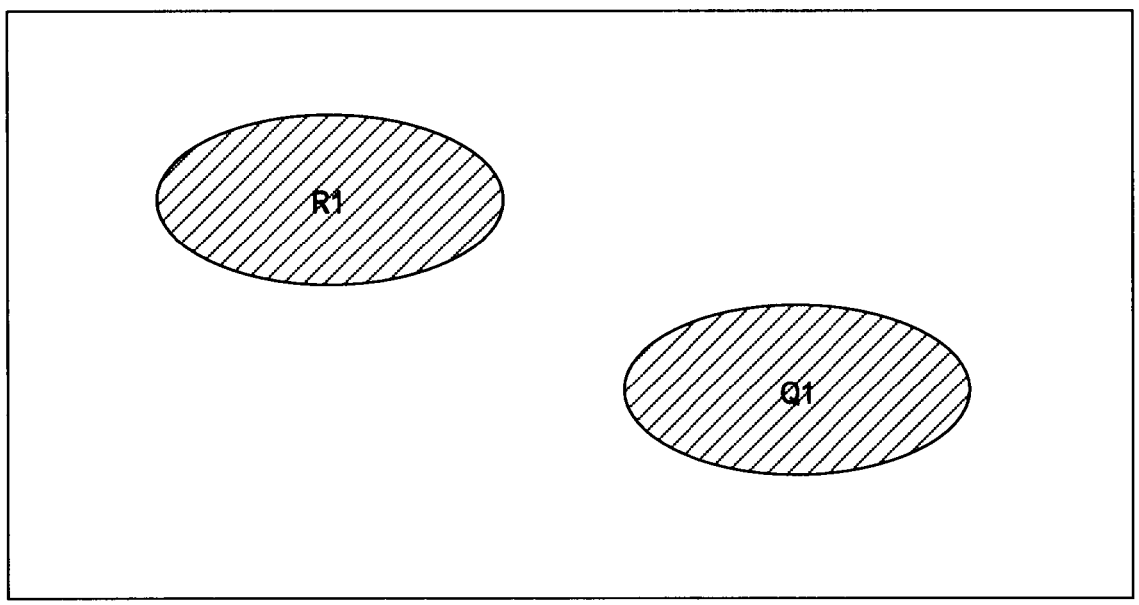
FIGS. 4a and 4b show backward tracking in order to classify and label regions of the last image in a set of images.
Figure 4B:
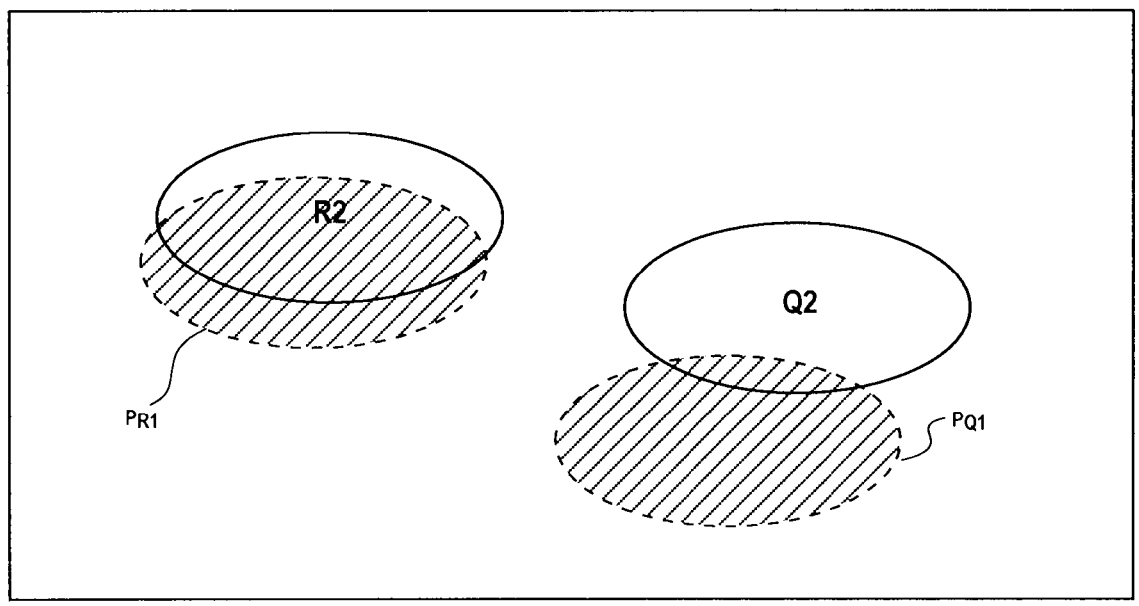

FIGS. 4*a* and 4*b* illustrate the backward tracking process. As can be seen, in FIG. 4*a* there are two regions R1 and Q1 in the second last greyscale input image, both labeled as representing foreground motion. FIG. 4*b* shows the pixels denoted by shading $P_{R1}$ and $P_{Q1}$ of the regions R1 and Q1 after being forward warped and projected onto the last greyscale input image. As can be seen, region R2 in the last greyscale input image corresponding to region R1 contains enough projected pixels to be labeled as representing foreground motion, while region Q2 corresponding to region Q1 does not.

The segmentation is improved where more temporal information is available. If desired, to reduce region labeling errors, backward tracking can be employed throughout the region classifying and labeling process. In this case, during backward tracking, the motion vectors estimated for consecutive greyscale input images in the set are used. In particular, for a greyscale input current image, the motion vectors generated for the regions of that input image are applied to the input image to generate a resultant image representing the current input image after motion. The resultant image is then compared to the successive greyscale input image in the set to determine if the images match. If the motion vectors are perfectly accurate, a match should result.

For example, the backward tracking can be applied to all of the pairs of images in the set from the last image back to the first image and each motion segmentation result can be refined based on the backward tracking result. By switching the order of the image sequence, the motion from the last image to the second last image can be estimated without using backward tracking although this is more computationally expensive as the motion vectors have to be calculated twice; namely in the forward direction from the first greyscale input image to the last greyscale input image and backwards from the last greyscale input image to the second last greyscale input image.

As will be appreciated, the region-based motion segmentation technique uses motion information and intensity difference for segmentation and uses temporal and spatial continuity to refine the segmentation result. The end result is a robust, computationally efficient and accurate motion detecting and estimating technique.

Although the first input image in the set is described as being selected as the reference image, those of skill in the art will appreciate that any input image in the set can be selected as the reference image. Values for thresholds have been provided above but those of skill in the art will appreciate that the specified values are exemplary. The thresholds can be changed to suit the particular image processing environment.

Although preferred embodiments have been described, those of skill in the art will appreciate that variations and modifications may be made without departing from the spirit and scope thereof as defined by the appended claims.

What is claimed is:

1. A method of determining motion in a set of input images, said method comprising:
   providing a processing device to implement the following step:
   receiving said set of input images, said set of input images having background motion and foreground motion;
   determine a first motion direction for a first group of pixels within a reference image within said set of input images;
   determine a second motion direction for a second group of pixel within said reference image;
   designating the dominant group of pixels within said reference image as background pixels;
   designating said background pixels as stationary content;
   registering the remaining images in said set of input images to said reference image to identify background stationary content therein;
   generating difference images based on the registered images;
   segmenting the input images into regions;
   estimating local motion within each of said regions; and
   determining whether the regions include moving content or static content based on the difference images and the local estimated motion within said regions;
   wherein said local motion estimating comprises generating a motion vector for each region in each of said images with the exception of the last image in said set;
   wherein said region content determining for each region comprises:
      determining whether the motion vector for the region signifies movement above a threshold and if so labeling the region as representing foreground moving content;
      if not, determining whether the percentage of pixels in the region have a pixel value above a threshold in the corresponding difference image and if so labeling the region as representing foreground moving content; and
      if not labeling the region as representing background stationary content; and
   for a given region in a grayscale input image designated as background stationary content, checking the labeling of its three corresponding regions in three previous grayscale input images, and if more than seventy percent of the pixels within the three corresponding regions are designated as representing foreground movement content, then changing the designation of the given region from background stationary content to foreground movement content.

2. The method of claim 1 wherein said difference image generating comprises determining the difference between each remaining image in said set of input images and said reference image to yield absolute intensity difference images.

3. The method of claim 1 further comprising binarizing the difference images.

4. The method of claim 3 further comprising noise filtering the binarized difference images.

5. The method of claim 1 wherein said difference image generating comprises determining the difference between each remaining image in said set and said reference image to yield absolute intensity difference images.

6. The method of claim 5 wherein said noise filtering is performed by morphing said binarized images.

7. The method of claim 1 wherein said segmenting comprises applying the Watershed algorithm to said input images and compensating for over-segmentation of said input images.

8. The method of claim 7 wherein said compensating comprises merging each region of each input image that is below a threshold size with a boundary region.

9. The method of claim 8 wherein for each region, said boundary region is selected from one of a region greater than said threshold size and the largest boundary region smaller than said threshold size.

10. The method of claim 9 further comprising binarizing the difference images to identify foreground pixels based on the true/false results of the binarized difference.

11. The method of claim 1 wherein said motion vector generating for each region comprises:
    for each pixel in the region, calculating the absolute difference between the pixel and a corresponding pixel in the subsequent input image in said set;
    summing the calculated absolute differences;
    shifting the position of the region according to a search pattern and for each position in the search pattern reperforming the calculating and summing; and
    selecting the motion vector associated with the position of the region that yields the minimum absolute difference sum.

12. A method of determining motion in a set of input images, said method comprising:
    providing a processing device to implement the following step:
    receiving said set of input images, said set of input images having background motion and foreground motion;
    determine a first motion direction for a first group of pixels within a reference image within said set of input images;
    determine a second motion direction for a second group of pixel within said reference image;
    designating the dominant group of pixels within said reference image as background pixels;
    designating said background pixels as stationary content;

registering the remaining images in said set of input images to said reference image to identify background stationary content therein;
generating difference images based on the registered images;
segmenting the input images into regions;
estimating local motion within each of said regions; and
determining whether the regions include moving content or static content based on the difference images and the local estimated motion within said regions;
wherein said local motion estimating comprises generating a motion vector for each region in each of said images with the exception of the last image in said set;
wherein said region content determining for each region comprises:
  determining whether the motion vector for the region signifies movement above a threshold and if so labeling the region as representing foreground moving content;
  if not, determining whether the percentage of pixels in the region have a pixel value above a threshold in the corresponding difference image and if so labeling the region as representing foreground moving content; and
if not labeling the region as representing background stationary content; and
  for a given region within a given grayscale input image designated as foreground movement content, determining if its neighboring regions within the given grayscale input image are designated as representing background stationary content, and if so, then if the total size of neighboring regions designated as representing background stationary content is larger than the size of the given region and the given region is further smaller than a predefined size, then changing the designation of the given region from foreground movement content to background stationary content.

13. The method of claim 1 wherein for said last input image in the set, the local motion estimating comprises projecting motion shifted pixels from regions of the second last input image onto the last input image and wherein the region content determining comprises for each corresponding region in the last input image determining whether a threshold number of projected motion shifted pixels fall within the region.

14. The method of claim 12 further comprising:
  for a given region within a given grayscale input image designated as background stationary content, determining if its neighboring regions within the given grayscale input image are designated as representing foreground movement content, and if so, then if the total size of neighboring regions designated as representing foreground movement content is larger than the size of the given region and the given region is further smaller than a predefined size, then changing the designation of the given region from background stationary content to foreground movement content.

* * * * *